US008363928B1

(12) United States Patent
Sharp

(10) Patent No.: US 8,363,928 B1
(45) Date of Patent: Jan. 29, 2013

(54) GENERAL ORIENTATION POSITIONING SYSTEM

(75) Inventor: Kevin Andrew Ian Sharp, Christchurch (NZ)

(73) Assignee: Trimble Navigation Ltd., Sunnyvale, CA (US)

( * ) Notice: Subject to any disclaimer, the term of this patent is extended or adjusted under 35 U.S.C. 154(b) by 221 days.

(21) Appl. No.: 12/978,428

(22) Filed: Dec. 24, 2010

(51) Int. Cl.
*G06K 9/00* (2006.01)
*G06K 9/32* (2006.01)
*G01B 11/14* (2006.01)
*H04N 7/18* (2006.01)

(52) U.S. Cl. ........ 382/154; 382/100; 382/293; 356/614; 348/143

(58) Field of Classification Search .................. 382/154, 382/106, 100, 109, 293; 345/419, 418, 427, 345/423; 356/604, 601, 614, 4.03; 348/95, 348/E7.085, 137, 142, 143; 700/159, 259, 700/254
See application file for complete search history.

(56) References Cited

U.S. PATENT DOCUMENTS

| | | | |
|---|---|---|---|
| 5,633,995 A * | 5/1997 | McClain ....................... 345/419 |
| 5,642,285 A | 6/1997 | Woo | |
| 6,147,598 A | 11/2000 | Murphy | |
| 6,282,362 B1 | 8/2001 | Murphy | |
| 6,330,503 B1 * | 12/2001 | Sharp et al. ..................... 701/50 |
| 7,339,611 B2 | 3/2008 | Marold | |
| 7,541,974 B2 | 6/2009 | Scherzinger | |
| 7,555,143 B2 * | 6/2009 | Flath et al. .................... 382/109 |
| 7,619,561 B2 | 11/2009 | Scherzinger | |
| 7,697,127 B2 | 4/2010 | Vogel | |
| 7,719,467 B2 | 5/2010 | Norda | |
| 7,995,799 B2 * | 8/2011 | Schultz et al. ................. 382/106 |
| 8,036,452 B2 * | 10/2011 | Pettersson et al. ............ 382/154 |
| 2004/0264763 A1 * | 12/2004 | Mas et al. ...................... 382/154 |
| 2005/0125142 A1 | 6/2005 | Yamane | |
| 2009/0262974 A1 | 10/2009 | Lithopoulos | |
| 2010/0141759 A1 | 6/2010 | Scherzinger | |
| 2010/0172546 A1 | 7/2010 | Sharp | |
| 2010/0174507 A1 | 7/2010 | Vogel | |

FOREIGN PATENT DOCUMENTS

| | | |
|---|---|---|
| EP | 1931945 A2 | 6/2008 |
| EP | 1936323 A2 | 6/2008 |
| EP | 1944572 A1 | 7/2008 |
| EP | 2240740 A1 | 10/2010 |
| WO | WO2009100773 | 8/2009 |
| WO | WO2009100774 | 8/2009 |
| WO | WO2009103342 | 8/2009 |
| WO | WO2009106141 | 9/2009 |
| WO | WO2010080950 | 7/2010 |

* cited by examiner

*Primary Examiner* — Sheela Chawan
(74) *Attorney, Agent, or Firm* — Boris G. Tankhilevich

(57) ABSTRACT

A method for determining an absolute orientation in a global coordinate system is provided. In each grid position an image capturing device is directed to a selected object located in a scene. The method comprises: (A) reconstructing a scale model of the scene using point, line and/or region correspondences in multiple views of the scene obtained by the image capturing device placed in at least three grid positions; (B) obtaining location coordinates of at least three grid positions in the global coordinate system; and (C) determining a similarity transform from a photogrammetric coordinate system to the global coordinate system by determining rotation, translation and scale of the image capturing device for each grid position.

32 Claims, 3 Drawing Sheets

Similarity Relationship

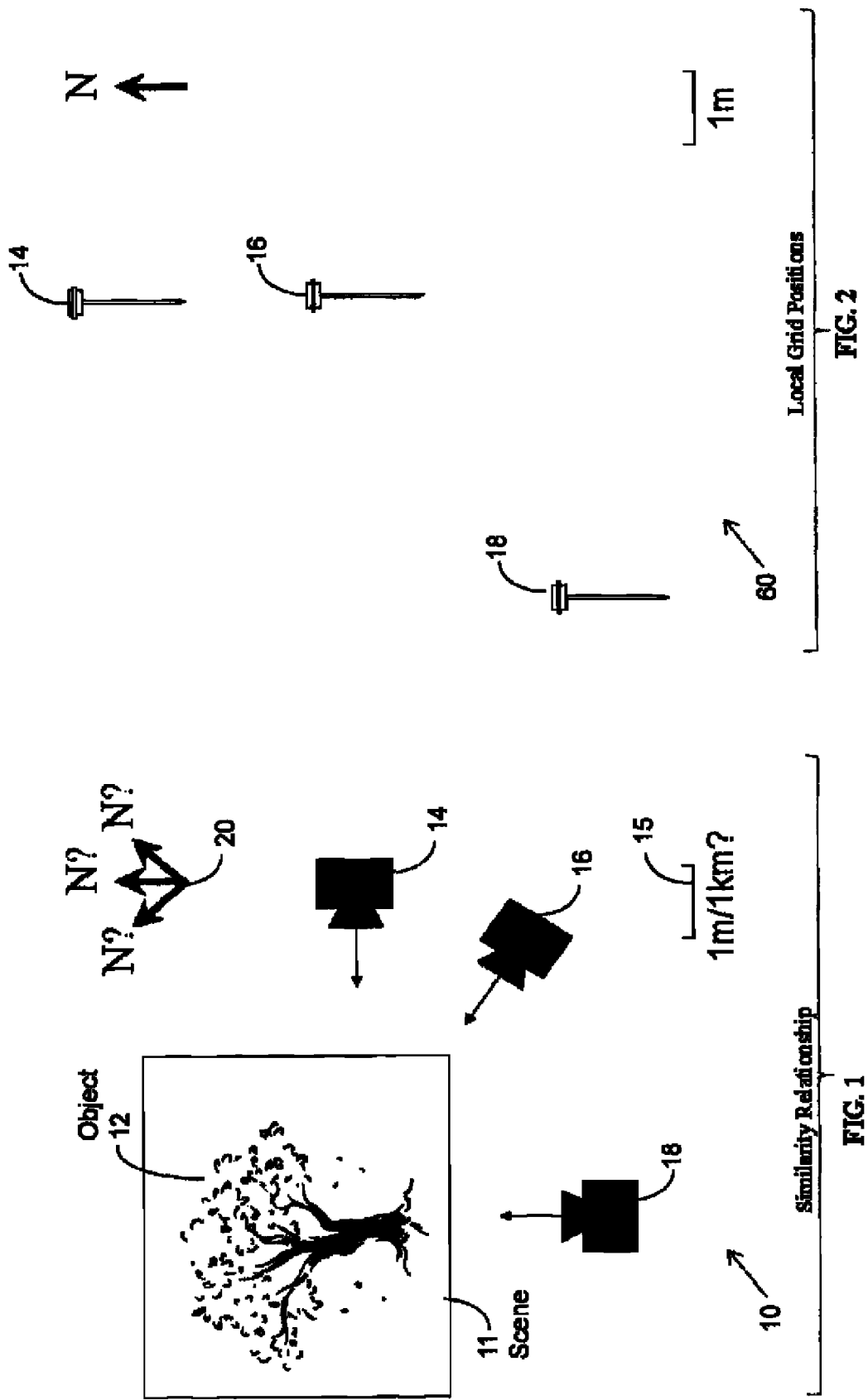

GENERAL ORIENTATION POSITIONING SYSTEM

TECHNICAL FIELD

The technology relates to the field of similarity transform based positioning.

BACKGROUND

There are many situations wherein it is important to know both position and orientation of a camera (or eye in an optical see through system). For example, this is the case with an augmented reality system.

Orientation can be determined if all 3 Euler Angles—yaw, pitch and roll—are known. It is relatively straightforward to determine pitch and roll since gravity can be used as a reference and measurements can be made using accelerometers. Yaw, however, is more difficult to determine.

Indeed, even though various references are available including solar or astral sources, Coriolis forces, Earth's magnetic field or introduced infrastructure such as radio beacons to find yaw, for many applications these references are too unreliable, too noisy or require apparatus which is too bulky.

The present technology allows to determine the global azimuth (absolute yaw) without introducing any infra structure to the site (other than that one required for RTK GPS).

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method for determining an absolute orientation in a global coordinate system is provided. An image capturing device placed in at least three grid positions is directed to a selected object located in a scene.

The method comprises: (A) reconstructing a scale model of a scene using point, line and/or region correspondences in multiple views of the scene obtained by the image capturing device placed in at least three grid positions; (B) obtaining location coordinates of at least three grid positions in the global coordinate system; and (C) determining a similarity transform from a photogrammetric coordinate system to the global coordinate system by determining rotation, translation and scale transformations of an image capturing device in each grid position.

DESCRIPTION OF THE DRAWINGS

The accompanying drawings, which are incorporated in and form a part of this specification, illustrate embodiments of the technology and, together with the description, serve to explain the principles below:

FIG. 1 depicts a scene to be reconstructed by matching points in multiple views of the scene obtained by an image capturing device placed in at least three grid positions for the purposes of the present technology.

FIG. 2 illustrates three grid positions with known positions coordinates in the global coordinate system utilized in reconstruction of a scale model of the scene of FIG. 1 for the purposes of the present technology.

DETAILED DESCRIPTION

Figure 4:
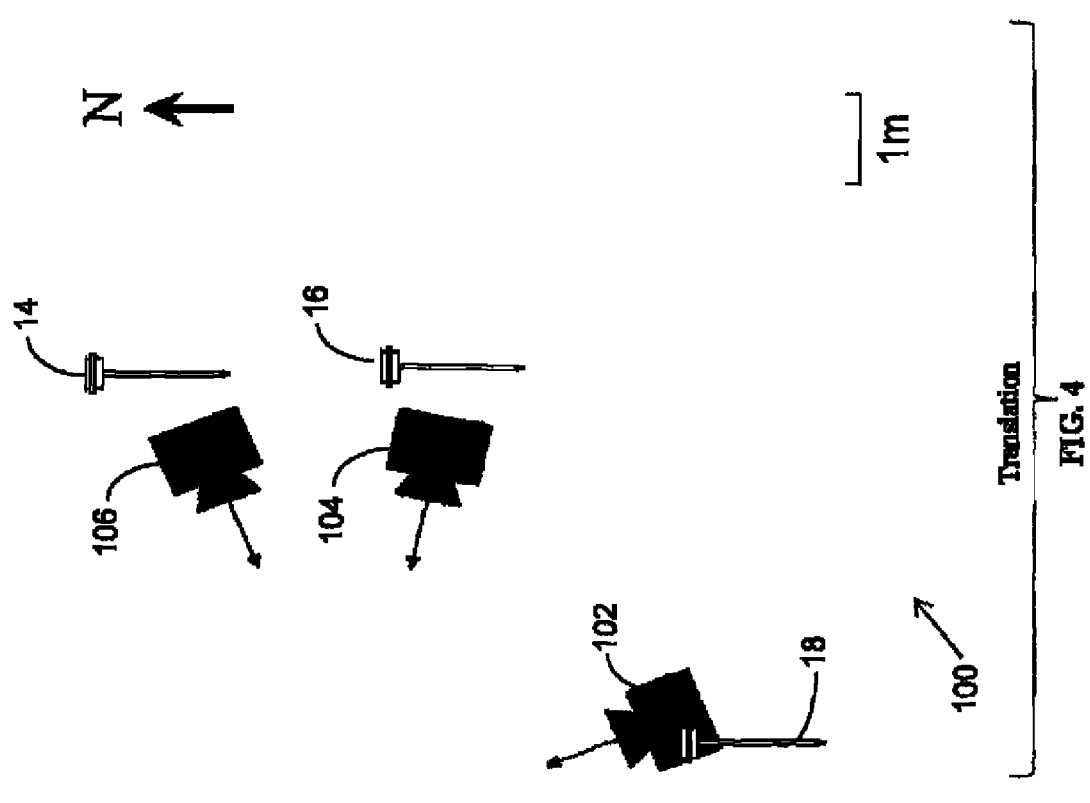
FIG. 4 depicts the position and orientation of the image capturing device in the first grid position after the translation step is performed from the photogrammetric coordinate system of the image capturing device to the global coordinate system, the position and orientation of the image capturing device in the second grid position after the translation step is performed from the photogrammetric coordinate system of the image capturing device to the global coordinate system, and the position and orientation of the image capturing device in the third grid position after the translation step is performed from the photogrammetric coordinate system of the image capturing device to the global coordinate system for the purposes of the present technology.

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

In an embodiment of the present technology, a scale model (or a photogrammetric reconstruction) of the scene 11 of FIG. 1 is reconstructed by matching points in multiple views of the scene 11 obtained by an image capturing device placed in at least three grid positions 14, 16, and 18. Indeed, an image capturing device (a camera, for example), as disclosed in details below, is all that is needed to reconstruct a scale model of the scene.

The scale model of the scene 11 contains 3D points that were imaged from at least two grid positions, and coordinate frames of the image capturing device at each grid position. The points and coordinate frames are in a photogrammetric coordinate system which is related to the global coordinate system by an initially unknown scale, rotation and translation. As shown in FIG. 1, the orientation of North 13 is unknown, and the scale 15 is also unknown.

In an embodiment of the present technology, the scale model of the scene 11 of FIG. 1 is reconstructed by using known photogrammetric methods. The scale model contains the coordinate frames of the imaging device at each of three grid positions 14, 16, and 18, in an arbitrary photogrammetric coordinate system. The scale model describes relative translations and relative rotations between coordinate frames of the imaging device, but has no scale or reference to a world coordinate frame.

If for each view one also obtains the position of an image capturing device in a global coordinate system, it is possible to find a transformation from the photogrammetric coordinate system to the global coordinate system.

The similarity transformation from the photogrammetric coordinate system to the global coordinate system consists of a rotation, translation and scale. When applied to an image capturing device placed in three grid positions 14, 16, and 18, it gives poses of the image capturing device placed in three grid positions 14, 16, and 18 in the global coordinate system. For simplicity, the diagrams show only the determination of global azimuth, but the algorithm also determines pitch and roll w.r.t. the global coordinate system.

Therefore, one can determine an absolute orientation in the global coordinate system of an image capturing device placed in three grid positions 14, 16, and 18; wherein the Center of the image capturing device at one grid position is the origin of the photogrammetric coordinate system. This means that the present technology allows one to build a general orientation positioning system. In addition, once an absolute orientation is known, a relative orientation system (such as a MEMS gyro) can be used to give a continuous orientation data.

In an embodiment of the present technology, an image capturing device is selected from the group consisting of: a digital camera; a digital video camera; a digital camcorder; a stereo digital camera; a stereo video camera; a motion picture camera; and a television camera.

In an embodiment of the present technology, the image capturing device is a light-tight box in which an image of a scene 11 is formed by a pinhole or lenses at a sensor plate (not shown). Still video and digital cameras store the images in a solid-state memory, or on magnetic media or optical disks.

Motion picture or cine cameras record movement at regular intervals in a series of frames. Television and video cameras record movement electronically for broadcast and storage on magnetic media or optical disks. Camcorders are video cameras which contain both the image sensor and recording media in a single unit.

Except for pinhole cameras, which focus the image on the film through a tiny hole, all other cameras use lenses for focusing. The focal length of lenses, i.e., the distance between the rears of the lenses (when focused on infinity) the imaging device, determines the angle of view, or field of view (FOV) and the size of objects as they appear on the imaging surface-sensor plate. The image is focused on that surface by adjusting the distance between the lenses and the surface.

In an embodiment of the present technology, an image capturing device further comprises a stereo digital camera. A stereo camera is a type of camera with two or more lenses. This allows the camera to simulate binocular vision, and therefore gives it the ability to capture three-dimensional images, a process known as stereo photography. Stereo cameras may be used for making stereo views and 3D pictures for movies, or for range imaging. 3-D Images Ltd., located in UK, produces a 3-D Digital Stereo camera—a fully automatic, time synchronized, digital stereo camera. Point Grey Research Inc., located in Canada produces binoculars or multiple array cameras that can provide full field of view 3 D measurements of an unstructured environment.

In an embodiment of the present technology, the origin of a photogrammetric coordinate system of an image capturing device (or the Center of the image capturing device) is selected from the group consisting of: a Physical Center; and a Virtual Optical Center.

According to the US Patent application "VIRTUAL OPTICAL CENTER ALIGNED WITH MEASUREMENT CENTER", Ser. No. 12/717,003, filed on Mar. 3, 2010, the actual optical center and the virtual optical center are created using an optical element to modify the path of the light rays entering the an image capturing device. The actual optical center may be defined as the point between the optical element and the image sensor at which the light rays intersect that form an image. The virtual optical center may be defined as the point at which the light rays would intersect if their path were not altered by the optical element and taking into account any other modifications in the path between the optical element and the image sensor. The optical element may be arranged such that the virtual optical center of the image capturing device is coincident with, or located at a fixed position with respect to, a center of a position measurement system. This simplifies the computations required to define the actual optical center of the image capturing device in the real world coordinate frame.

The US Patent application "VIRTUAL OPTICAL CENTER ALIGNED WITH MEASUREMENT CENTER" is assigned to the assignee of the present patent application, and is incorporated herein in its entirety.

In an embodiment of the present technology, the method for determining of an absolute orientation in a global coordinate system comprises the following steps. At first, as was disclosed above, a scale model of the scene 11 is reconstructed by using point, line and/or region correspondences in multiple views of the scene 11 obtained by an image capturing device placed in at least three grid positions 14, 16 and 18, whereas the image capturing device in each grid position is directed to a selected object 12 located in the scene 11.

In an embodiment of the present technology, at the next step, the location coordinates of the grid positions 14, 16, and 18 are obtained in the global coordinate system.

In an embodiment of the present technology, location coordinates of a grid position 14, 16, or 18 are determined by using a radio positioning system (RADPS) receiver selected from the group consisting of: a GPS receiver; a GLONASS receiver; a combined GPS/GLONASS receiver; a GALILEO receiver; a COMPASS receiver; a Global Navigational Satellite System (GNSS) receiver; and a pseudolite receiver.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency $f1=1575.42$ MHz (approximately nineteen centimeter carrier wavelength) and an L2 signal having a frequency $f2=1227.6$ MHz (approximately twenty-four centimeter carrier wavelength). These two frequencies are integral multiplies $f1=1,540$ $f0$ and $f2=1,200$ $f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude.

The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where $k=(1, 2, 24)$ is the channel or satellite number. These frequencies lie in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code.

The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

The European Union started deploying in 2010 an independent satellite navigation system Galileo as a part of a global navigation satellite infrastructure (GNSS).

The GALILEO system is based on a constellation of 30 satellites and ground stations providing information concerning the positioning of users in many sectors such as transport (vehicle location, route searching, speed control, guidance systems, etc.), social services (e.g. aid for the disabled or elderly), the justice system and customs services (location of suspects, border controls), public works (geographical information systems), search and rescue systems, or leisure (direction-finding at sea or in the mountains, etc.).

The COMPASS system (also known as Beidou-2, BD2) is a project by China to develop an independent global satellite navigation system. COMPASS is not an extension to the previously deployed Beidou-1, but a new GNSS similar in principle to GPS and Galileo.

The new system will be a constellation of 35 satellites, which include 5 geostationary orbit (GEO) satellites and 30 medium Earth orbit (MEO) satellites that will offer complete coverage of the globe. The ranging signals are based on the CDMA principle and have complex structure typical to Galileo or modernized GPS. Similarly to the other GNSS, there will be two levels of positioning service: open and restricted (military). The public service shall be available globally to general users. When all the currently planned GNSS systems are deployed, the users will benefit from the use of a total constellation of 75+ satellites, which will significantly improve all the aspects of positioning, especially availability of the signals in so-called "urban canyons"

Reference to a Radio Positioning System (RADPS) herein refers to a Global Positioning System, to a Global Orbiting Navigation System, to GALILEO System, to a COMPASS System, and to any other compatible Global Navigational Satellite System (GNSS) satellite-based system that provides information by which an observer's position and the time of observation can be determined, all of which meet the requirements of the present technology, and to a ground based radio positioning system such as a system comprising of one or more pseudolite transmitters.

A pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability.

The complete description of the pseudolite transmitters in GPS band can be found in "Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautics and Astronautics, Inc., in 1966.

In an embodiment of the present technology, FIG. 2 illustrates 60 three grid positions 18, 16, and 14 with known positions coordinates in the global coordinate system utilized in reconstruction of a scale model of the scene of FIG. 1 for the purposes of the present technology.

Referring still to FIG. 1, in an embodiment of the present technology, at the following step, a similarity transform from the photogrammetric coordinate system to the global coordinate system is determined by determining rotation, translation and scale of the image capturing device for each grid position 14, 16, and 18.

Figure 3:
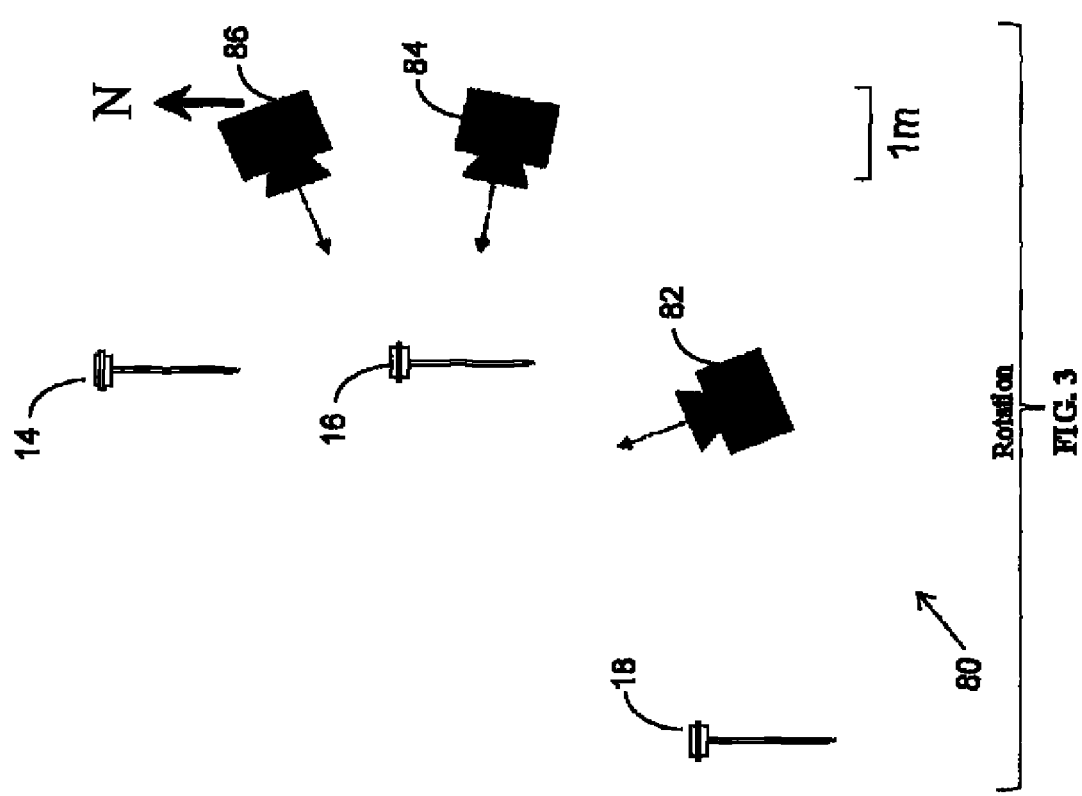
FIG. 3 shows the position and orientation of the image capturing device in the first grid position after the rotation step is performed from the photogrammetric coordinate system of the image capturing device to the global coordinate system, the position and orientation of the image capturing device in the second grid position after the rotation step is performed from the photogrammetric coordinate system of the image capturing device to the global coordinate system, and the position and orientation of the image capturing device in the third grid position after the rotation step is performed from the photogrammetric coordinate system of the image capturing device to the global coordinate systema for the purposes of the present technology.

In an embodiment of the present technology, FIG. 3 shows 80 the position and orientation of the image capturing device 82 in grid position 18, the position and orientation of the image capturing device 84 in grid position 16, and the position and orientation of the image capturing device 86 in grid position 14 after the rotation step is performed from the photogrammetric coordinate system of an image capturing device to the global coordinate system.

In an embodiment of the present technology, FIG. 4 shows 100 the position and orientation of the image capturing device 102 in grid position 18, the position and orientation of the image capturing device 104 in grid position 16, and the position and orientation of the image capturing device 106 in grid position 14, after the translation step is performed from the photogrammetric coordinate system of the image capturing device to the global coordinate system.

Figure 5:
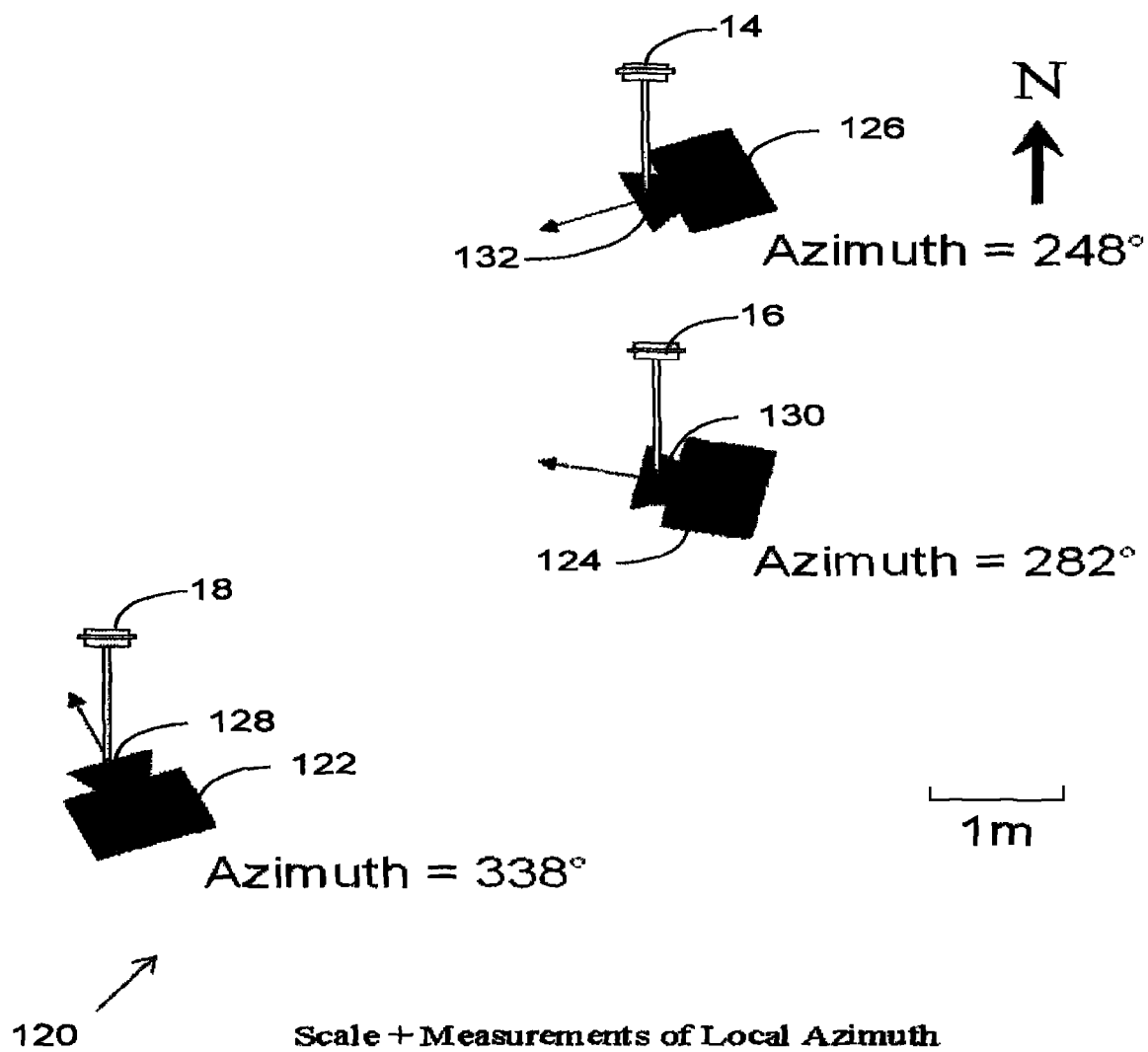
FIG. 5 illustrates the position and orientation of the image capturing device in the first grid position after the scale transformation step is performed from the photogrammetric coordinate system of the image capturing device to the global coordinate system, the position and orientation of the image capturing device in the second grid position after the scale transformation step is performed from the photogrammetric coordinate system of the image capturing device to the global coordinate system, and the position and orientation of the image capturing device in the third grid position after the scale transformation step is performed from the photogrammetric coordinate system of the image capturing device to the global coordinate system for the purposes of the present technology.

In an embodiment of the present technology, FIG. 5 shows 120 the position and orientation 128 of the image capturing device 122 in grid position 18, the position and orientation 130 of the image capturing device 124 in grid position 16, and the position and orientation 132 of the image capturing device 126 in grid position 14, after the scale transformation step is performed from the photogrammetric coordinate system to the global coordinate system for the purposes of the present technology.

In an embodiment of the present technology, the rotation transformation from a photogrammetric coordinate system to the global coordinate system for each grid position is determined by using singular value decomposition (SVD) of the similarity transform.

In an embodiment of the present technology, the translation transformation from a photogrammetric coordinate system to the global coordinate system for each grid position is performed by subtracting a mean value in the similarity transform.

In an embodiment of the present technology, a scale transformation from a photogrammetric coordinate system to the global coordinate system for each grid position is performed by using a standard deviation in the similarity transform.

In linear algebra, the singular value decomposition (SVD) is an important factorization of a rectangular (real or complex) matrix.

The singular value decomposition (SVD) can be used for the purposes of the present technology to solve a set of homogeneous linear equations.

In an embodiment of the present technology, calculation of Similarity Transforms is performed by using Procrustean Alignment.

In an embodiment of the present technology, more specifically, the similarity transform variant of the Orthogonal Procrustes algorithm takes a set of points in one coordinate system, A, and those same points in a different coordinate system, B. The object is to find a similarity transform (translation, rotation and isotropic scaling) which when applied to the points in A makes them as close as possible to the points in B, in a least-squares sense.

We are given n corresponding points $pA_1 \ldots pA_n$ and $pB_1 \ldots pB_n$. The method is most easily applied if one calculates the transform using non-homogenous coordinates (of the form $[x, y, z]^T$), but calculate the transform to be applied to homogeneous coordinates (of the form $[x, y, z, 1]^T$). The transform one is solving for is a four by four homogeneous transform $X_{A \to B}$ such that $$\sum_{i=1}^{n}(pB_i - X_{A \to B} \cdot pA_i)^2$$

is minimised.

The first step is to subtract the mean from each set of points so that they are both 'zero meaned' . . .

$$\overline{pA} = \frac{\sum_{i=1}^{n} pA_i}{n}, \; pA'_i = pA_i \; \overline{pA}\text{-}$$

$$\overline{pB} = \frac{\sum_{i=1}^{n} pB_i}{n}, \; pB'_i = pB_i \; \overline{pB}\text{-}$$

(Eqs. 1)

The second step is to scale the data according to its standard deviation . . .

$$\sigma_A = \sum_{i=1}^{n} pA_i'^T \cdot pA'_i, \; pA''_i = pA'_i / \sigma_A$$

$$\sigma_B = \sum_{i=1}^{n} pB_i'^T \cdot pB'_i, \; pB''_i = pB'_i / \sigma_B$$

(Eqs. 2)

The transform from A" to B" can then be determined by singular value decomposition (SVD)

$$USV^T = svd\left(\sum_{i=1}^{n}(pA''_i) \cdot (pB''_i)^T\right)$$

(Eq. 3)

$V^T U^T$ will be an orthogonal transform from $pA_i''$ to $pB_i''$.

However, in order to ensure that it is a rotation matrix one should check its determinant i.e.

$$\text{if } |V^T U^T| = 1$$
$$\text{then } R_{A' \to B''} = V^T U^T$$
$$\text{else } R_{A' \to B''} = V^T \begin{bmatrix} 1 & 0 & 0 \\ 0 & 1 & 0 \\ 0 & 0 & -1 \end{bmatrix} U^T$$

(Eq. 4)

The transformation $X_{A \to B}$ may now be calculated by compounding the sub-transforms . . .

$$X_{A \to B} = \begin{bmatrix} 0 & 0 & 0 \\ 0 & 0 & 0 & \overline{pB} \\ 0 & 0 & 0 \\ 0 & 0 & 0 & 1 \end{bmatrix} \begin{bmatrix} \sigma_B & 0 & 0 & 0 \\ 0 & \sigma_B & 0 & 0 \\ 0 & 0 & \sigma_B & 0 \\ 0 & 0 & 0 & 1 \end{bmatrix} \begin{bmatrix} & & & 0 \\ & R_{A' \to B'} & & 0 \\ & & & 0 \\ 0 & 0 & 0 & 1 \end{bmatrix} \begin{bmatrix} \sigma_A^{-1} & 0 & 0 & 0 \\ 0 & \sigma_A^{-1} & 0 & 0 \\ 0 & 0 & \sigma_A^{-1} & 0 \\ 0 & 0 & 0 & 1 \end{bmatrix} \begin{bmatrix} 0 & 0 & 0 \\ 0 & 0 & 0 & -\overline{pA} \\ 0 & 0 & 0 \\ 0 & 0 & 0 & 1 \end{bmatrix} \quad \text{(Eq. 5)}$$

Referring still to FIG. 5, after the absolute orientation of the image capturing device has been determined (for example, azimuth 338° in grid position 18, azimuth 282° in grid position 16, and azimuth 248° in grid position 14), a relative orientation system can be used to substantially continuously obtain orientation data for the image capturing device starting from the absolute orientation of the image capturing device.

In an embodiment of the present technology, the relative orientation system is selected from the group consisting of: a MEMS gyro; an accelerometer; and an inertial navigational system.

Referring still to FIG. 1, in an embodiment of the present technology, one can reconstruct a scale model of the scene 11 using point, line and/or region correspondences in multiple views of the scene obtained by using three different image capturing devices, each image capturing device being placed in one grid position 18, 16, and 14. Each image capturing device is directed to a selected object 12 located in scene 11.

In one embodiment of the present technology, each set of viewing data of the selected object 12 is transmitted among image capturing devices.

In another embodiment of the present technology, each set of viewing data of the selected object 12 is transmitted to a database (not shown).

In one embodiment of the present technology, one can build a database of orientations of an initial image capturing device in the global coordinate system in each grid position, and consequently determine an orientation of a secondary image capturing device placed in at least one predetermined grid position by directing the secondary image capturing device to at least one selected object located in the scene and by accessing the database of orientations.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for determining an absolute orientation in a global coordinate system comprising:
   (A) reconstructing a scale model of a scene including an image capturing device by using point, line and/or region correspondences in multiple views of said scene obtained by said image capturing device placed in at least three grid positions; wherein said image capturing device in each said grid position is directed to a selected object located in said scene;
   (B) obtaining location coordinates of said grid positions in said global coordinate system;
   and
   (C) determining a similarity transform from a photogrammetric coordinate system to said global coordinate system by determining rotation, translation and scale for each said grid position; wherein orientation of said image capturing device in said global coordinate system in each said grid position is obtained.

2. The method of claim 1 further comprising:
   (D) determining an orientation of an external vector in said global coordinate system in each said grid position; wherein an orientation of said external vector in said photogrammetric coordinate system of said image capturing device in each said grid position is known.

3. The method of claim 1, wherein said step (A) further comprises:
   (A2) obtaining at least three views of said scene by using said image capturing device selected from the group consisting of: a digital camera; a digital video camera; a digital camcorder; a stereo digital camera; a stereo video camera; a motion picture camera; and a television camera.

4. The method of claim 1, wherein said step (B) further comprises:
   (B1) determining location coordinates of each said grid position.

5. The method of claim 1, wherein said step (B) further comprises:
(B2) determining location coordinates of each said grid position by using a radio positioning system (RADPS) receiver selected from the group consisting of: a GPS receiver; a GLONASS receiver; a combined GPS/GLONASS receiver; a GALILEO receiver; a COMPASS receiver; a Global Navigational Satellite System (GNSS) receiver; and a pseudolite receiver.

6. The method of claim 1, wherein said step (C) further comprises:
(C1) determining a rotation transformation from said photogrammetric coordinate system to said global coordinate system for each said grid position of said image capturing device by using singular value decomposition (SVD) of said similarity transform.

7. The method of claim 1, wherein said step (C) further comprises:
(C2) determining a translation transformation from said photogrammetric coordinate system to said global coordinate system for each said grid position of said image capturing device by subtracting a mean value in said similarity transform.

8. The method of claim 1, wherein said step (C) further comprises:
(C3) determining a scale transformation from said photogrammetric coordinate system to said global coordinate system for each said grid position of said image capturing device by using a standard deviation in said similarity transform.

9. The method of claim 1 further comprising:
(D) substantially continuously obtaining orientation data for said image capturing device in said global coordinate system from an initial orientation of said image capturing device obtained in said global coordinate system by using a relative orientation system.

10. The method of claim 9, wherein said step (D) further comprises:
(D1) selecting said relative orientation system from the group consisting of: a MEMS gyro; an accelerometer; and an inertial navigational system.

11. A method for determining an absolute orientation in a global coordinate system comprising:
(A) reconstructing a scale model of a scene using point, line and/or region correspondences in multiple views of said scene obtained by using a plurality of image capturing devices, each said image capturing device being placed in a grid position; wherein each said image capturing device in each said grid position is directed to at least one selected object located in said scene;
(B) obtaining location coordinates of said grid positions in said global coordinate system; and
(C) determining a similarity transform from each said photogrammetric coordinate system to said global coordinate system by determining rotation, translation and scale of each said image capturing device locate in one said grid position; wherein orientation of each said image capturing device in said global coordinate system in each said grid position is obtained.

12. The method of claim 11 further comprising:
(D) transmitting a set of viewing data of said selected object obtained by each image capturing device between each said image capturing device.

13. The method of claim 11 further comprising:
(E) transmitting a set of viewing data of said selected object obtained by each said image capturing device to a database of viewing data of said selected object.

14. The method of claim 11 further comprising:
(F) determining an orientation of an external vector in said global coordinate system in each said grid position; wherein an orientation of said external vector in said photogrammetric coordinate system in each said grid position is known.

15. The method of claim 11, wherein said step (A) further comprises:
(A1) obtaining at least three views of said scene by using at least three image capturing devices; wherein at least one said image capturing device is selected from the group consisting of: a digital camera; a digital video camera; a digital camcorder; a stereo digital camera; a stereo video camera; a motion picture camera; and a television camera.

16. The method of claim 11, wherein said step (A) further comprises:
(A2) obtaining a plurality of views of said scene by using a plurality of image capturing devices.

17. The method of claim 11, wherein said step (B) further comprises:
(B1) determining location coordinates of each said grid position.

18. The method of claim 11, wherein said step (B) further comprises:
(B2) determining location coordinates of each said grid position by using a radio positioning system (RADPS) receiver selected from the group consisting of: a GPS receiver; a GLONASS receiver; a combined GPS/GLONASS receiver; a GALILEO receiver; a COMPASS receiver; a Global Navigational Satellite System (GNSS) receiver; and a pseudolite receiver.

19. The method of claim 11, wherein said step (C) further comprises:
(C1) using a set of viewing data of said selected object obtained by each said image capturing device to determine a rotation transformation from said photogrammetric coordinate system to said global coordinate system for each said grid position by using singular value decomposition (SVD) of said similarity transform.

20. The method of claim 11, wherein said step (C) further comprises:
(C2) using a set of viewing data of said selected object obtained by each said image capturing device to determine a translation transformation from said local coordinate system to said global coordinate system for each said grid position by subtracting a mean value in said similarity transform.

21. The method of claim 11, wherein said step (C) further comprises:
(C3) using a set of viewing data of said selected object obtained by each said image capturing device to determine a scale transformation from said photogrammetric coordinate system to said global coordinate system for each said grid position by using a standard deviation in said similarity transform.

22. A method for determining an absolute orientation in a global coordinate system comprising:
(A) reconstructing a scale model of a scene using point, line and/or region correspondences in multiple views of said scene obtained by using a plurality of initial image capturing devices, each said initial image capturing device being placed in a predetermined grid position;

wherein each said initial image capturing device in each said grid position is directed to at least one selected object located in said scene;

(B) determining a similarity transform from a photogrammetric coordinate system of an initial image capturing device to said global coordinate system by determining rotation, translation and scale of said initial image capturing device for each said grid position;

(C) building a database of orientations of said initial image capturing device in said global coordinate system for each said grid position; and (D) determining an orientation of a secondary image capturing device placed in at least one said predetermined grid position by directing said secondary image capturing device to said at least one selected object located in said scene and by accessing said database of orientations.

23. An apparatus for determining of an absolute orientation in a global coordinate system comprising:

(A) a means for reconstructing a scale model of a scene using point, line and/or region correspondences in multiple views of said scene by using at least one image capturing device placed in at least three grid positions; wherein said image capturing device in each said grid position is directed to the same selected object located in said scene;

(B) a means for obtaining location coordinates of a plurality of grid positions of said image capturing device in said global coordinate system; and (C) a means determining a similarity transform from a photogrammetric coordinate system to said global coordinate system by determining rotation, translation and scale of said image capturing device for each said grid position; wherein orientation of said image capturing device in said global coordinate system in each said grid position is obtained.

24. The apparatus of claim 23, wherein said means (A) further comprises:

(A1) an image capturing device selected from the group consisting of: a digital camera; a digital video camera; a digital camcorder; a stereo digital camera; a stereo video camera; a motion picture camera; and a television camera.

25. The apparatus of claim 23, wherein said means (B) further comprises:

(B1) a radio positioning system (RADPS) receiver selected from the group consisting of: a GPS receiver; a GLONASS receiver; a combined GPS/GLONASS receiver; a GALILEO receiver; a COMPASS receiver; a Global Navigational Satellite System (GNSS) receiver; and a pseudolite receiver.

26. The apparatus of claim 23, wherein said means (C) further comprises:

(C1) a processor configured to determine a rotation transformation from said photogrammetric coordinate system to said global coordinate system for each said grid position of said image capturing device by using singular value decomposition (SVD) of said similarity transform.

27. The apparatus of claim 23, wherein said means (C) further comprises:

(C2) a processor configured to determine a translation transformation from said photogrammetric coordinate system to said global coordinate system for each said grid position of said image capturing device by subtracting a mean value in said similarity transform.

28. The apparatus of claim 23, wherein said means (C) further comprises:

(C3) a processor configured to determine a scale transformation from said photogrammetric coordinate system to said global coordinate system for each said grid position of said image capturing device by using a standard deviation in said similarity transform.

29. The apparatus of claim 23 further comprising:

(D) a relative orientation system configured to substantially continuously obtain a relative orientation data of said image capturing device in said global coordinate system from said absolute orientation data of said image capturing device in said global coordinate system.

30. The apparatus of claim 29, wherein said means (D) further comprises:

(D1) a relative orientation system selected from the group consisting of: a MEMS gyro; an accelerometer; and an inertial navigational system.

31. The apparatus of claim 23 further comprising:

(E) a transmitter configured to transmit to a database a set of viewing data of said selected object.

32. The apparatus of claim 23 further comprising:

(F) a receiver configured to receive a set of viewing data of said selected object from said database.

* * * * *